US008539277B2

(12) United States Patent
Chang et al.

(10) Patent No.: US 8,539,277 B2
(45) Date of Patent: Sep. 17, 2013

(54) MANYCORE NETWORKS-ON-CHIP

(75) Inventors: Yung-Chang Chang, Hsinchu (TW);
Shih-Yin Lin, Hsinchu (TW);
Chung-Kai Liu, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 337 days.

(21) Appl. No.: 13/103,991

(22) Filed: May 9, 2011

(65) Prior Publication Data
US 2012/0155482 A1    Jun. 21, 2012

(30) Foreign Application Priority Data
Dec. 20, 2010  (TW) ............................... 99144827 A

(51) Int. Cl.
*G06F 11/00*  (2006.01)
(52) U.S. Cl.
USPC .......................................... 714/4.2; 370/217
(58) Field of Classification Search
USPC .................. 714/4.1, 4.2, 10; 370/216, 217
See application file for complete search history.

(56) References Cited

U.S. PATENT DOCUMENTS

| | | | |
|---|---|---|---|
| 4,868,818 A | 9/1989 | Madan et al. | |
| 5,271,014 A | 12/1993 | Bruck et al. | |
| 5,280,107 A | 1/1994 | Kawasaki et al. | |
| 5,280,607 A | 1/1994 | Bruck et al. | |
| 5,513,313 A | 4/1996 | Bruck et al. | |
| 5,742,753 A | 4/1998 | Nordsieck et al. | |
| 5,884,017 A * | 3/1999 | Fee ............................... 714/4.3 | |
| 6,622,257 B1 | 9/2003 | Rollins et al. | |
| 6,925,578 B2 | 8/2005 | Lam et al. | |
| 6,973,559 B1 * | 12/2005 | Deneroff et al. ................ 712/12 | |
| 7,113,506 B1 | 9/2006 | Cao | |
| 7,139,928 B1 | 11/2006 | Bhattacharya et al. | |
| 7,564,780 B2 * | 7/2009 | Rabbat et al. ................. 370/228 | |
| 7,590,886 B2 | 9/2009 | Moscirella et al. | |

FOREIGN PATENT DOCUMENTS
TW     1303834     12/2008

OTHER PUBLICATIONS

Chang et al, "On the Design and Analysis of Fault Tolerant NoC Architecture Using Spare Routers," IEEE, 2011, pp. 431-436.
Shamshiri et al "Yield and Cost Analysis of a Reliable NoC," IEEE VLSI Test Symposium, Jun. 25, 2009, pp. 173-178.
Lehtonen et al., "Self-Adaptive System for Addressing Permanent Errors in On-Chip Interconnects," IEEE Transactions on Very Large Scale Integration Systems, 2009, pp. 1-14.
Zhang et al., "On Topology Reconfiguration for Defect-Tolerant NoC-Based Homogeneous Manycore Systems," IEEE Transactions on Very Large Scale Integration Systems, vol. 17, No. 9, Sep. 2009, pp. 1173-1186.
Truong et al., "A 167-Processor Computational Platform in 65 nm CMOS," IEEE Journal of Solid-State Circuits, vol. 44, No. 4, Apr. 2009, pp. 1130-1144.

(Continued)

*Primary Examiner* — Scott Baderman
*Assistant Examiner* — Joseph Kudirka
(74) *Attorney, Agent, or Firm* — Jianq Chyun IP Office

(57) ABSTRACT

A manycore networks-on-chip (NoC) formed by a plurality of clusters is provided. The manycore NoC includes redundant routers and connection channels therefore is fault-tolerant as long as the numbers of damaged routers and damaged connection channels are under predetermined thresholds. Moreover, the NoC can retain its original logical topology without isolating any core after resetting the connection channels in response to the damaged routers and connection channels.

16 Claims, 24 Drawing Sheets

(56) References Cited

OTHER PUBLICATIONS http://www.tilera.com/products/processors/TILE-Gx_Family, retrieved Apr. 29, 2011.

http://techresearchintel.com/ResearchAreaDetails.aspx?Id=27, retrieved Apr. 29, 2011.

http://www.itrs.net/links/2009ITRS/Home2009.htm, retrieved Apr. 29, 2011.

* cited by examiner

MANYCORE NETWORKS-ON-CHIP

CROSS-REFERENCE TO RELATED APPLICATION

This application claims the priority benefit of Taiwan application serial no. 99144827, filed Dec. 20, 2010. The entirety of the above-mentioned patent application is hereby incorporated by reference herein and made a part of this specification.

TECHNICAL FIELD

The disclosure relates to a manycore networks-on-chip (NoC).

BACKGROUND

Processor architectures with over a hundred cores have been provided since the semiconductor manufacturing process of integrated circuits entered the deep sub-micron (DSM) era. Each of the many cores of a processor architecture is a fully functional processor. Such a processor architecture with many cores is referred to as a manycore system.

The advancement of semiconductor manufacturing process makes integration possible but also brings problems in system yield and reliability. The decrease of yield and system instability caused by signal integrity are very serious on the DSM level. The conventional bus architecture cannot deal with today's huge data flow due to its limitation in scalability, efficiency, and power. Thus, the networks-on-chip (NoC) architecture has become today's standard manycore connection architecture.

In a manycore system, each core works independently or multiple cores work together on a relatively more complicated job. In order to coordinate with each other, the cores need to transmit signals to each other. Accordingly, signal routing is required. FIG. 1 is a schematic diagram of a conventional manycore NoC 100, wherein the circles marked with P are processors, and the squares marked with R are routers. The manycore NoC 100 includes sixteen processors and sixteen corresponding routers. The routers are connected with each other to form a 4×4 matrix, and the processors are respectively connected to the corresponding routers. The processors transmit signals to each other through the routers, and the routers perform signal routing among the processors.

A router may be damaged, and a connection channel between a router and a processor may also be damaged. For example, as shown in FIG. 2, the routers 112 and 132 are damaged, and the connection channel 123 between the router 122 and the processor 121 and the connection channel 143 between the router 142 and the processor 141 are also damaged.

Foregoing damaged routers and connection channels may cause many problems. For example, a normal processor may be isolated by damaged routers and connection channels. As shown in FIG. 2, the processors 111, 121, 131, and 141 are not damaged, but they are isolated respectively by the damaged routers 112 and 132 and the damaged connection channels 123 and 143 therefore cannot contact other processors of the same network. If there are too many damaged routers, an entire network may even be separated into individual areas. For example, as shown in FIG. 3, because the routers 114, 122, 132, and 144 are all damaged, the manycore NoC 100 are separated into two individual areas 310 and 320. The processors of the area 310 cannot contact the processors of the area 320, and vice versa.

Thereby, how to provide a reliable NoC has become one of the major subjects in the industry.

In some conventional manycore NoCs, the microarchitectural redundancy of routers is adopted for reducing the damage rate of the routers. However, such a technique becomes not so cost-effective along with the increase in the number of processors.

SUMMARY

A manycore networks-on-chip (NoC) is introduced herein, wherein the operation efficiency and fault-tolerance of the manycore NoC are improved by using redundant routers.

The disclosure provides a manycore NoC including C clusters, wherein each of the clusters includes P cores and R routers, S=R−P, and C, P, R, and S are all positive integers.

Regarding each integer i that satisfies $1<=i<=C$ and each integer j that satisfies $1<=j<=P$, the $j^{th}$ core of the $i^{th}$ cluster is corresponding to a first set, the first set includes S+1 routers of the $i^{th}$ cluster, the $i^{th}$ cluster further includes connection channels between the $j^{th}$ core and each router in the first set, and the $j^{th}$ core is selectively coupled to one of the routers in the first set.

Regarding each integer i that satisfies $1<=i<=C$ and each integer k that satisfies $2<=k<=R$, the $k^{th}$ router of the $i^{th}$ cluster is corresponding to a second set, the second set includes 1 to S+1 routers before the $k^{th}$ router of the $i^{th}$ cluster, the $i^{th}$ cluster further includes connection channels between the $k^{th}$ router and each router in the second set, and the $k^{th}$ router is selectively coupled to one of the routers in the second set.

Regarding each integer i that satisfies $1<=i<=C$ and each integer k that satisfies $1<=k<=R-1$, the $k^{th}$ router of the $i^{th}$ cluster is corresponding to a third set, the third set includes 1 to S+1 routers after the $k^{th}$ router of the $i^{th}$ cluster, the $i^{th}$ cluster further includes connection channels between the $k^{th}$ router and each router in the third set, and the $k^{th}$ router is selectively coupled to one of the routers in the third set.

Regarding each integer i that satisfies $2<=i<=C$ and each integer k that satisfies $1<=k<=R$, the $k^{th}$ router of the $i^{th}$ cluster is corresponding to a fourth set, the fourth set includes 2 to 2S+1 routers of the $(i-1)^{th}$ cluster, the manycore NoC further includes connection channels between the $k^{th}$ router and each router in the fourth set, and the $k^{th}$ router is selectively coupled to one of the routers in the fourth set.

Regarding each integer i that satisfies $1<=i<=C-1$ and each integer k that satisfies $1<=k<=R$, the $k^{th}$ router of the $i^{th}$ cluster is corresponding to a fifth set, the fifth set includes 2 to 2S+1 routers of the $(i+1)^{th}$ cluster, the manycore NoC further includes connection channels between the $k^{th}$ router and each router in the fifth set, and the $k^{th}$ router is selectively coupled to one of the routers in the fifth set.

The routers transmit signals among the cores.

As described above, a manycore NoC provided by the disclosure is composed of a plurality of clusters. Because the manycore NoC includes redundant routers and connection channels, it is fault-tolerant as long as the number of damaged routers and connection channels is under a predetermined threshold. Moreover, after resetting the connection channels in response to the damaged routers and connection channels, the manycore NoC retains its original logical topology without isolating any core or region.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 4:
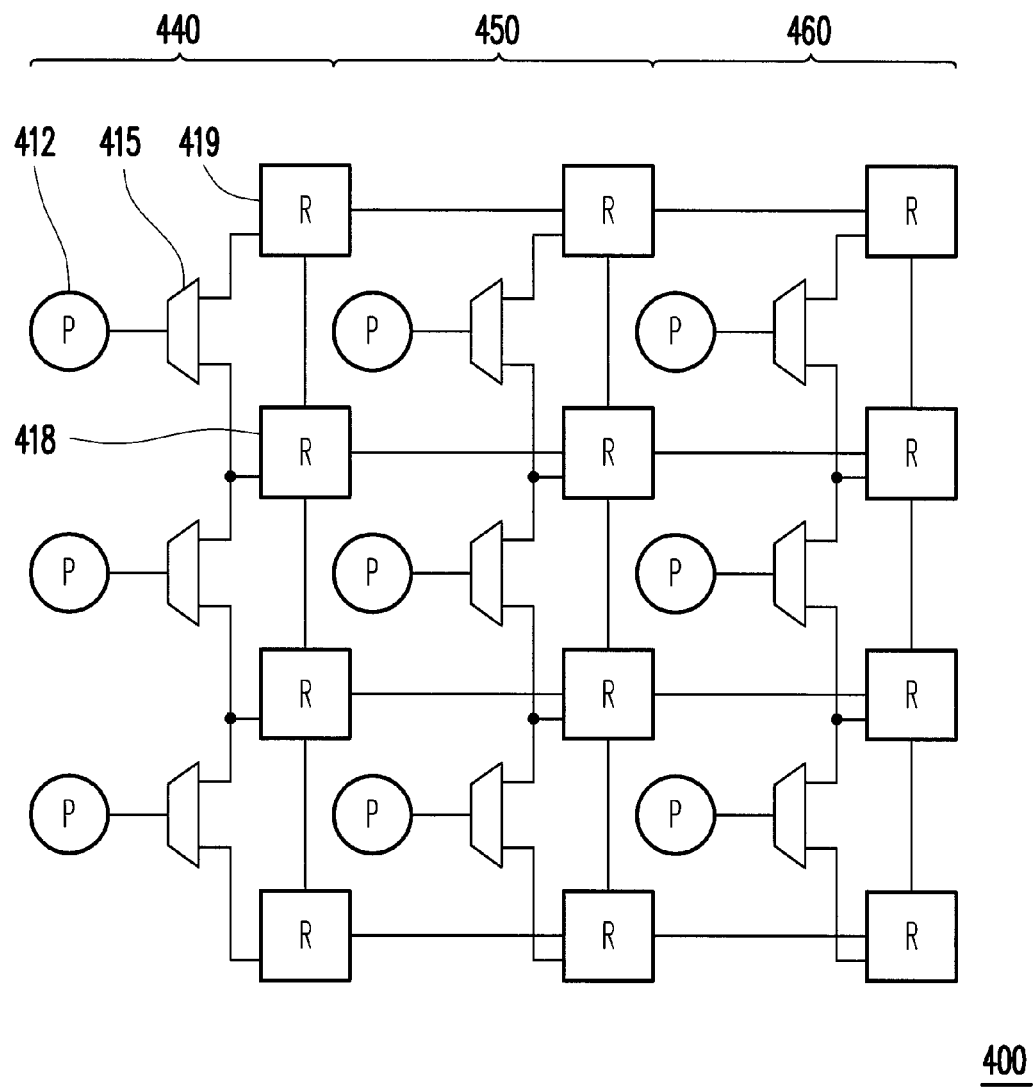
FIG. 4 and FIG. 5 are schematic diagrams of a manycore NoC according to an embodiment of the disclosure.
Figure 5:
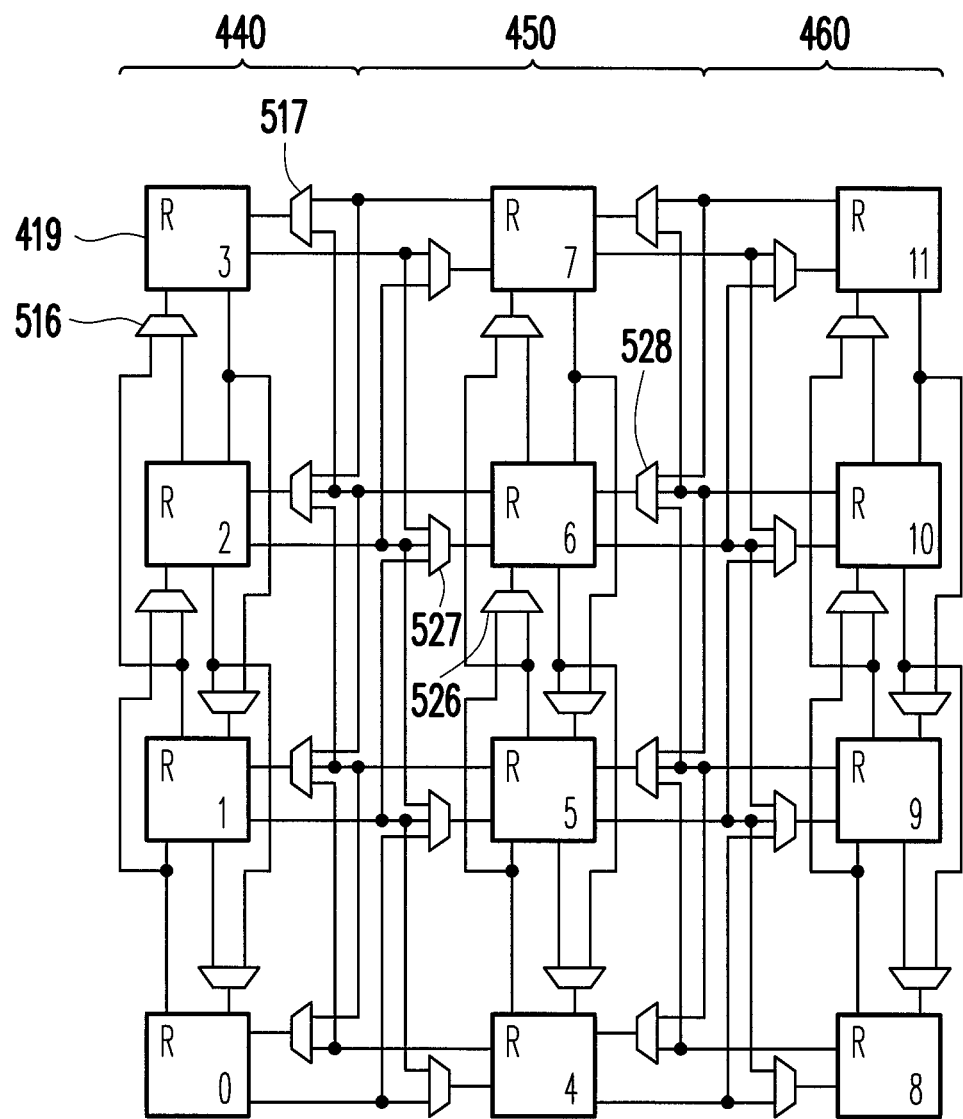

FIG. 4 and FIG. 5 are schematic diagrams of a manycore networks-on-chip (NoC) 400 according to an embodiment of the disclosure. In FIG. 4 and FIG. 5, the circles marked with P are cores (for example, the core 412), the squares marked with R are routers (for example, the router 419), and the trapezia are selectors (for example, the selector 415). Each core P may be a processor, a processing element, a data processing engine (DPE), a digital signal processor (DSP), a graphics processing unit (GPU), or a memory.

FIG. 4 illustrates the connections between the cores and the routers of the manycore NoC 400, and FIG. 5 illustrates the connections between the routers of the manycore NoC 400.

As shown in FIG. 4, the manycore NoC 400 includes three clusters 440, 450, and 460. Each cluster includes three cores in a column, three selectors in a column, and four routers in a column. In FIG. 4, the cores and the selectors are respectively corresponding to each other, and to achieve a fault-tolerant effect, each core is connected to two nearest routers of the same cluster respectively through two connection channels, wherein the two connection channels are controlled by the corresponding selector. The selector opens one of the two connection channels and closes the other one. Namely, each selector selects one of two nearest routers of the same cluster and couples the selected router with the corresponding core. For example, the selector 415 selects one of the routers 418 and 419 and couples the selected router with the corresponding core 412. Each core is coupled to a router that has undamaged connection channels and is fully functional through the corresponding selector, and each undamaged router is coupled to at most one core.

FIG. 5 illustrates the identification code of each router in the manycore NoC 400. For example, the identification code of the router at the bottom left corner is 0, the identification code of the router at the top left corner is 3, and the identification code of the router at the top right corner is 11. In following descriptions, a router is referred to by using a reference numeral or its identification code. For example, "router 419" and "router R3" both refer to the router at the top left corner.

In order to allow the manycore NoC 400 to work properly when a small number of routers and connection channels are damaged, redundant connection channels are prepared between the routers of the manycore NoC 400, and which the redundant channels are used is determined by using selectors. The basic rule is that each router is coupled to one of two nearest routers of the same cluster respectively at the top and the bottom and is coupled to one of three nearest routers respectively at the left and the right. The connection channels between the routers in FIG. 5 are unidirectional channels. Thus, each router is corresponding to two connection channels, wherein one of the two connection channels is used for outputting signals, the other one is used for inputting signals, and each of the connection channels satisfies aforementioned coupling rules. As to each of those routers at the edges or the corners, if there are less adjacent routers in a specific direction, the router is coupled to one of these adjacent routers, and if there is no adjacent router in a specific direction, the router is not coupled to any other router in this direction.

To be specific, in cluster 440, the router R0 is coupled to one of the routers R1 and R2 at the top, not coupled to any router at the bottom and the left, and coupled to one of the routers R4 and R5 at the right. The router R1 is coupled to one of the routers R2 and R3 at the top, coupled to the router R0 at the bottom, not coupled to any router at the left, and coupled to one of the routers R4, R5, and R6 at the right. The router R2 is coupled to the router R3 at the top, coupled to one of the routers R0 and R1 at the bottom, not coupled to any router at the left, and coupled to one of the routers R5, R6, and R7 at the right. The router R3 is not coupled to any router at the top and the left, coupled to one of the routers R1 and R2 at the bottom, and coupled to one of the routers R6 and R7 at the right.

In the cluster 450, the router R4 is coupled to one of the routers R5 and R6 at the top, not coupled to any router at the bottom, coupled to one of the routers R0 and R1 at the left, and coupled to one of the routers R8 and R9 at the right. The router R5 is coupled to one of the routers R6 and R7 at the top, coupled to the router R4 at the bottom, coupled to one of the routers R0, R1, and R2 at the left, and coupled to one of the routers R8, R9, and R10 at the right. The router R6 is coupled to the router R7 at the top, coupled to one of the routers R4 and R5 at the bottom, coupled to one of the routers R1, R2, and R3 at the left, and coupled to one of the routers R9, R10, and R11 at the right. The router R7 is not coupled to any router at the top, coupled to one of the routers R5 and R6 at the bottom, coupled to one of the routers R2 and R3 at the left, and coupled to one of the routers R10 and R11 at the right.

In the cluster 460, the router R8 is coupled to one of the routers R9 and R10 at the top, not coupled to any router at the bottom, coupled to one of the routers R4 and R5 at the left, and not coupled to any router at the right. The router R9 is coupled to one of the routers R10 and R11 at the top, coupled to the router R8 at the bottom, coupled to one of the routers R4, R5, and R6 at the left, and not coupled to any router at the right. The router R10 is coupled to the router R11 at the top, coupled to one of the routers R8 and R9 at the bottom, coupled to one of the routers R5, R6, and R7 at the left, and not coupled to any router at the right. The router R11 is not coupled to any router at the top and the right, coupled to one of the routers R9 and R10 at the bottom, and coupled to one of the routers R6 and R7 at the left.

Each router has many connection channels leading to all the adjacent routers that are coupled to the router. To each router, the input channel in each direction is controlled by a corresponding selector. Each selector opens one of the controlled connection channels and closes all other connection channels under control. For example, in FIG. 5, the selectors 516 and 517 are respectively corresponding to the bottom and right of the router R3. The selector 516 opens one of the input connection channels from the routers R1 and R2 and closes the other input connection channel. Namely, the selector 516 couples one of the routers R1 and R2 to the router R3. The selector 517 opens one of the input connection channels from the routers R6 and R7 and closes the other input connection channel. Namely, the selector 517 couples one of the routers R6 and R7 to the router R3.

In another example, the selectors 526, 527, and 528 are respectively corresponding to the bottom, left, and right of the router R6. In the same cluster, because there is only the router R7 above the router R6, the router R6 is not corresponding to any selector at the top, and the input connection channel from the router R7 can be directly coupled to the router R6. The selector 526 opens one of the input connection channels from the routers R4 and R5 and closes the other input connection channel. Namely, the selector 526 couples one of the d routers R4 and R5 to the router R6. The selector 527 opens one of the input connection channels from the routers R1, R2, and R3 and closes the other two input connection channels. Namely, the selector 527 couples one of the routers R1, R2, and R3 to the router R6. The selector 528 opens one of the input connection channels from the routers R9, R10, and R11 and closes the other two input connection channels. Namely, the selector 528 couples one of the routers R9, R10, and R11 to the router R6.

In order to coordinate with each other during the operation, the cores of the manycore NoC 400 transmit signals to each other, and these signals may be control signals or data signals. These signals are relayed by the many routers of the manycore NoC 400. The routers determine the transmission paths of foregoing signals within the manycore NoC 400 based on a predetermined routing algorithm. The routing technique of a manycore NoC is a well-known technique therefore will not be described herein.

In each cluster of the manycore NoC 400, there is one more router than the cores. Accordingly, the entire manycore NoC 400 can work properly as long as there is at most one damaged router in each cluster. When there are damaged routers or connection channels, the adjustment of the connection channels between the cores and the routers and the adjustment of the connection channels between the routers are controlled by the selectors. In the present embodiment, the selectors are implemented with multiplexers. However, the disclosure is not limited thereto. The selectors have small and simple structures and are durable therefore are more reliable than the routers. Thereby, in the present embodiment, no damaged selector is taken into consideration.

Figure 6:
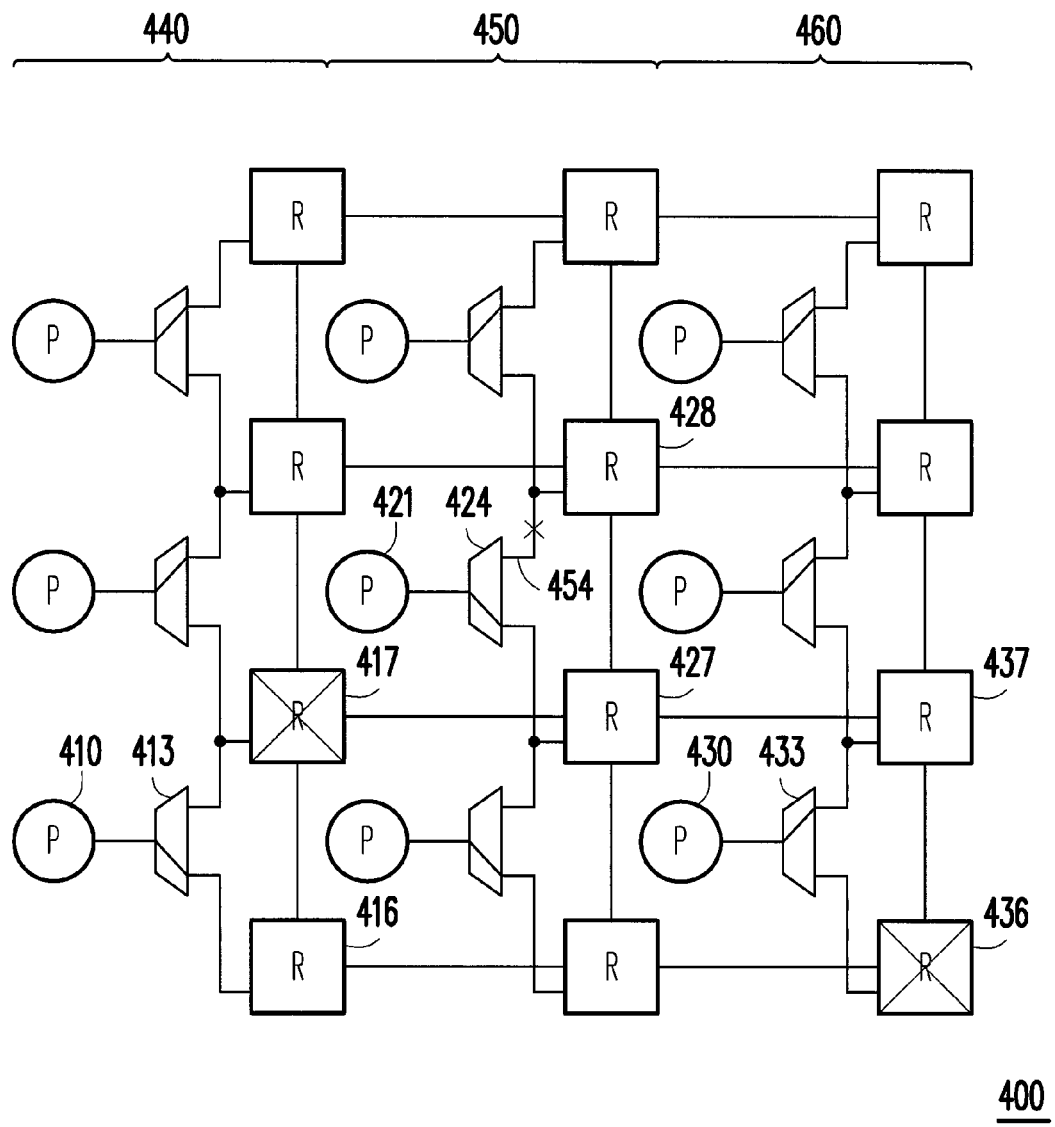
FIG. 6, FIG. 7, and FIG. 8 are schematic diagrams illustrating the fault-tolerant architecture of a manycore NoC according to an embodiment of the disclosure.

FIG. 6 illustrates an example of adjusting the connection channels between the cores and the routers when some routers and connection channels are damaged in the manycore NoC 400. As shown in FIG. 6, the routers 417 and 436 are damaged, and the connection channel 454 between the router 428 and the selector 424 is damaged. In each cluster, the three cores are respectively coupled with the three undamaged routers under the control of the selectors. Herein the selector 413 avoids the damaged router 417 and couples the core 410 with the router 416, the selector 424 avoids the damaged connection channel 454 and couples the core 421 with the router 427. The selector 433 avoids the damaged router 436 and couples the core 430 with the router 437. Through such adjustment, none of the cores is isolated, and each of the cores is coupled with an undamaged router through an undamaged connection channel and can contact any other core.

Each selector of the manycore NoC 400 receives a connection control signal generated by a connection pattern controller (not shown). The connection pattern controller may be a part or independent of the manycore NoC 400. The connection pattern controller generates the connection control signal according to distributions of the damaged routers and the damaged connection channels and controls each selector to couple the cores of each cluster with the routers of the same cluster in a one-on-one manner through the connection control signal. The connection pattern controller avoids damaged routers and connection channels and ensures the router coupled to each core and the connection channel between each core and the corresponding router to be undamaged.

In each cluster, restrictions may be put on the coupling relationship between the cores and the routers in order to make the coupling relationship to conform to the sequence of the cores and the routers in the cluster. To be specific, among a plurality of cores of the same cluster, if the core PA is before the core PB, the router coupled to the core PA is also before the router coupled to the core PB. The cores and routers in each cluster of the manycore NoC 400 are arranged from bottom to top. However, the coupling relationship between the cores and the routers of each cluster is not limited in the disclosure.

Figure 7:
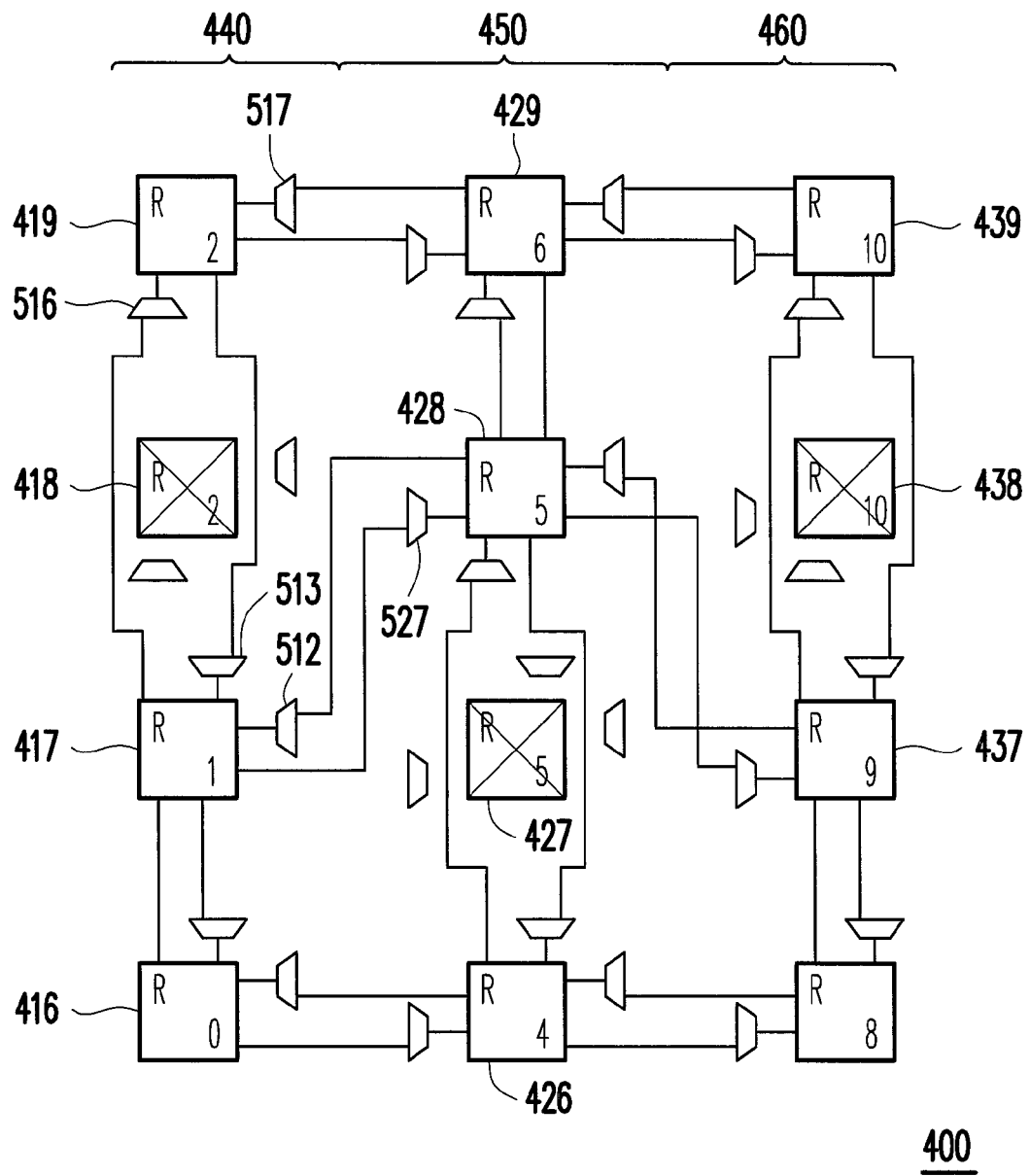

FIG. 7 illustrates an example of adjusting the connection channels between the routers and the identification codes of the routers when the routers 418, 427, and 438 of the manycore NoC 400 are damaged. Each router of the manycore NoC 400 also receives the connection control signal generated by the connection pattern controller. As shown in FIG. 7, when some routers are damaged in a specific cluster, the identification code of each router starting from the first damaged router is shifted forward according to the connection control signal. For example, the identification code 2 of the router 418 is shifted to the router 419 of the same cluster, the identification code 5 of the router 427 is shifted to the router 428 of the same cluster, the original identification code 6 of the router 428 is shifted to the router 429 of the same cluster, and the original identification code 10 of the router 438 is shifted to the router 439 of the same cluster. Why the identification codes of the routers are adjusted will be explained later on.

The connection pattern controller generates the connection control signal according to the distributions of the damaged routers and the damaged connection channels and controls the selectors of the manycore NoC 400 through the connection control signal to couple the routers of the manycore NoC 400 into an entire network. The connection pattern controller avoids damaged routers and connection channels and ensures each router in the entire network and the connection channels between the routers of the entire network to be undamaged.

FIG. 5 illustrates all the connection channels between the routers of the manycore NoC 400, and FIG. 7 only illustrates the connection channels between the routers that are opened by the selectors. For example, regarding the router 419, the selector 516 opens the input connection channel from the router 417 and closes the input connection channel from the router 418, and the selector 513 opens the input connection channel from the router 419 and closes the input connection channel from the router 418, so that the routers 417 and 419 can skip the damaged router 418 and be coupled with each other. On the other hand, the selector 512 opens the input connection channel from the router 428 and closes the input connection channels from the routers 426 and 427, and the selector 527 opens the input connection channel from the router 417 and closes the input connection channels from the routers 418 and 419, so that the routers 417 and 428 can be coupled with each other.

In the same cluster, the selectors corresponding to the top and bottom of the routers couples these routers in series according to a connection control signal in the sequence of the routers in the cluster. The connection pattern controller avoids damaged routers and connection channels and ensures that foregoing routers that are coupled in series and the connection channels between these routers are not damaged. For example, the coupling relationship of the routers 416, 417, and 419 illustrated in FIG. 7 conforms to the sequence of the routers 416, 417, and 419 in the corresponding cluster. The same applies to the routers 426, 428, and 429.

FIG. 7 illustrates the adjustment of connection channels in the manycore NoC 400 caused by damaged routers. The connection channels may be adjusted in the same way when there are damaged connection channels between the routers. For example, if the router 418 in FIG. 7 is not damaged but the connection channel between the routers 417 and 418 is damaged, the connection pattern controller controls related selectors to skip the router 418 and couple the routers 417 and 419, as shown in FIG. 7. Similarly, if the router 427 in FIG. 7 is not damaged but the connection channel between the routers 417 and 427 is damaged, the connection pattern controller controls related selectors to couple the router 417 to another undamaged router in the cluster 450 (for example, to the router 428, as shown in FIG. 7).

Regarding adjacent two clusters, the selectors corresponding to the left and right of each router couple undamaged routers of one of the clusters to the same number of undamaged routers of the other cluster in a one-on-one manner according to the connection control signal. Besides avoiding damaged routers, the connection pattern controller also avoids damaged connection channels and ensures that none of the connection channels between the undamaged routers of the foregoing two adjacent clusters is damaged.

Restrictions can be put on the coupling relationship between routers of adjacent two clusters so as to allow the coupling relationship to conform to the sequences of the routers respectively in the corresponding clusters. To be specific, if there are two adjacent clusters CA and CB, a router RA is before a router RB in the cluster CA, the router RA is coupled to a router RC of the cluster CB, and the router RB is coupled to a router RD of the cluster CB, then in the cluster CB, the router RC must be before the router RD. For example, in FIG. 7, the routers 416, 417, and 419 belong to the same cluster, the routers 426, 428, and 429 belong to another cluster, and the coupling relationship between these six routers satisfies aforementioned rule. However, the coupling relationship between the routers of two adjacent clusters is not limited in the disclosure.

Figure 1:
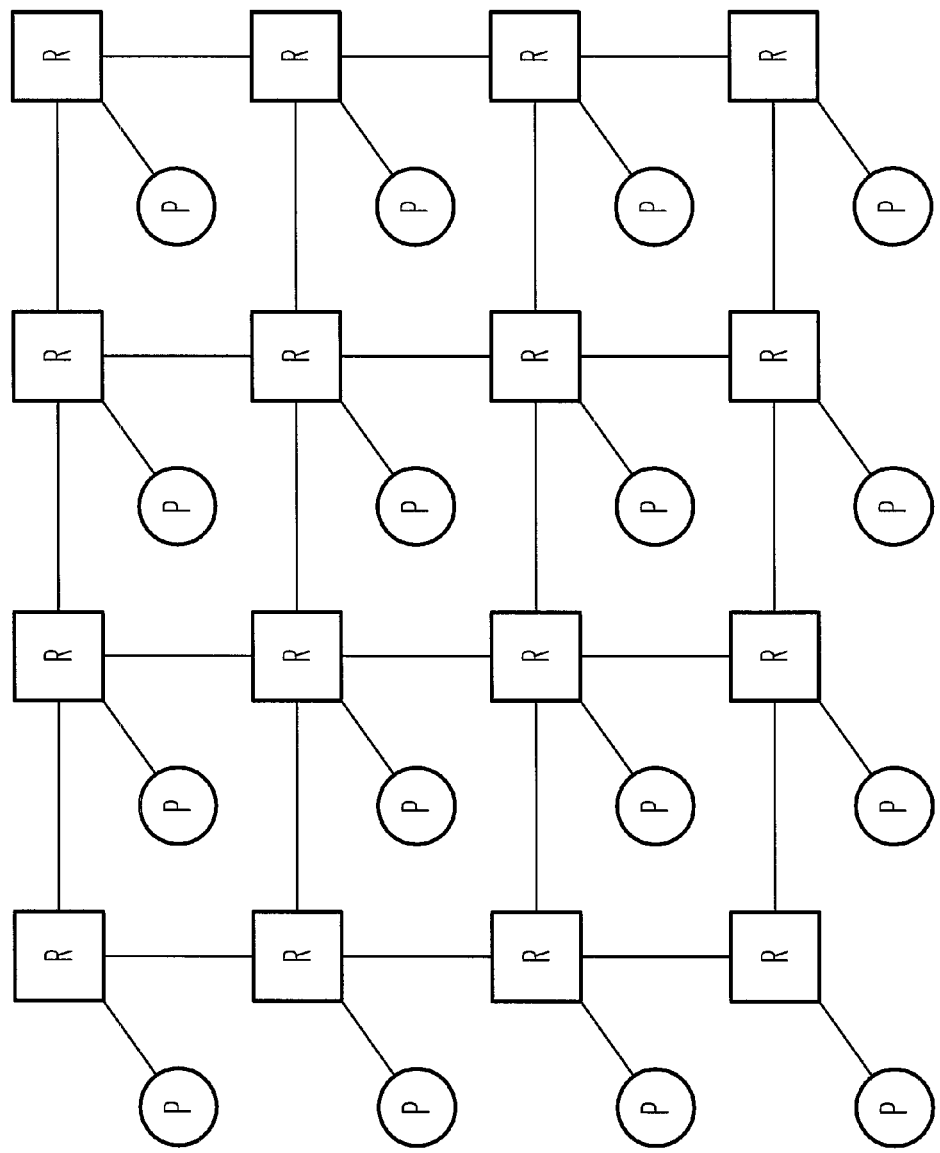
FIG. 1, FIG. 2, and FIG. 3 are schematic diagrams of a conventional manycore networks-on-chip (NoC).
Figure 2:
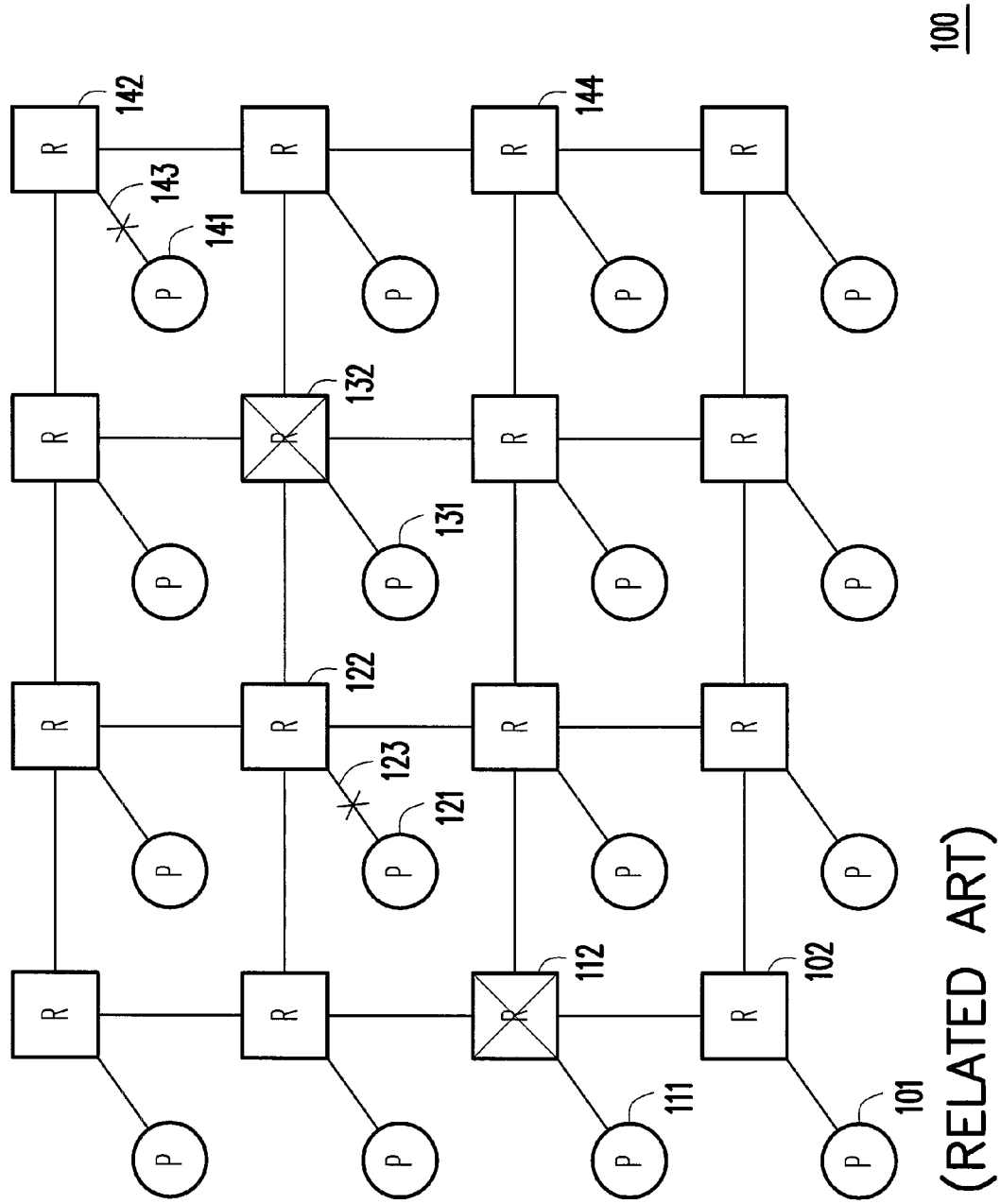
Figure 3:
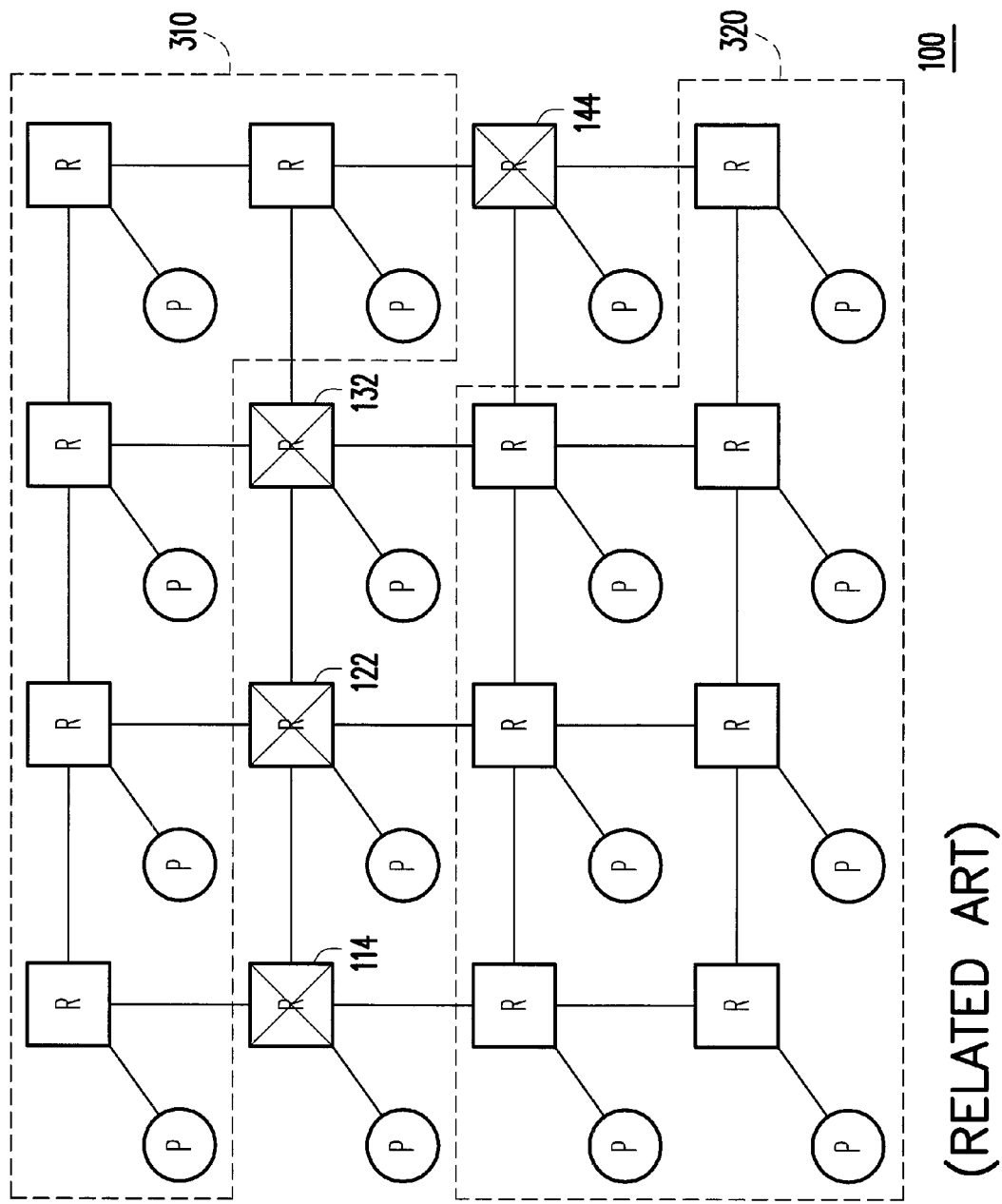

In the manycore NoC 400 illustrated in FIG. 7, there is a damaged router in each column. If such a situation happens in the conventional manycore NoC 100 illustrated in FIG. 1, separated areas will be produced, as shown in FIG. 3. However, because the manycore NoC 400 in the present embodiment includes redundant routers and connection channels, no separated area will be produced even if the damages illustrated in FIG. 7 occur.

The fault-tolerant architecture of the manycore NoC 400 is composed of selectors, redundant routers, and redundant connection channels. The manufacturer of the manycore NoC 40 can test which routers and connection channels are damaged after the manycore NoC 400 is manufactured and then make the connection pattern controller to generate the corresponding connection control signal to adjust the coupling relationship between the cores and the routers and the coupling relationship between the routers, so as to achieve a fault-tolerant purpose.

Figure 8:
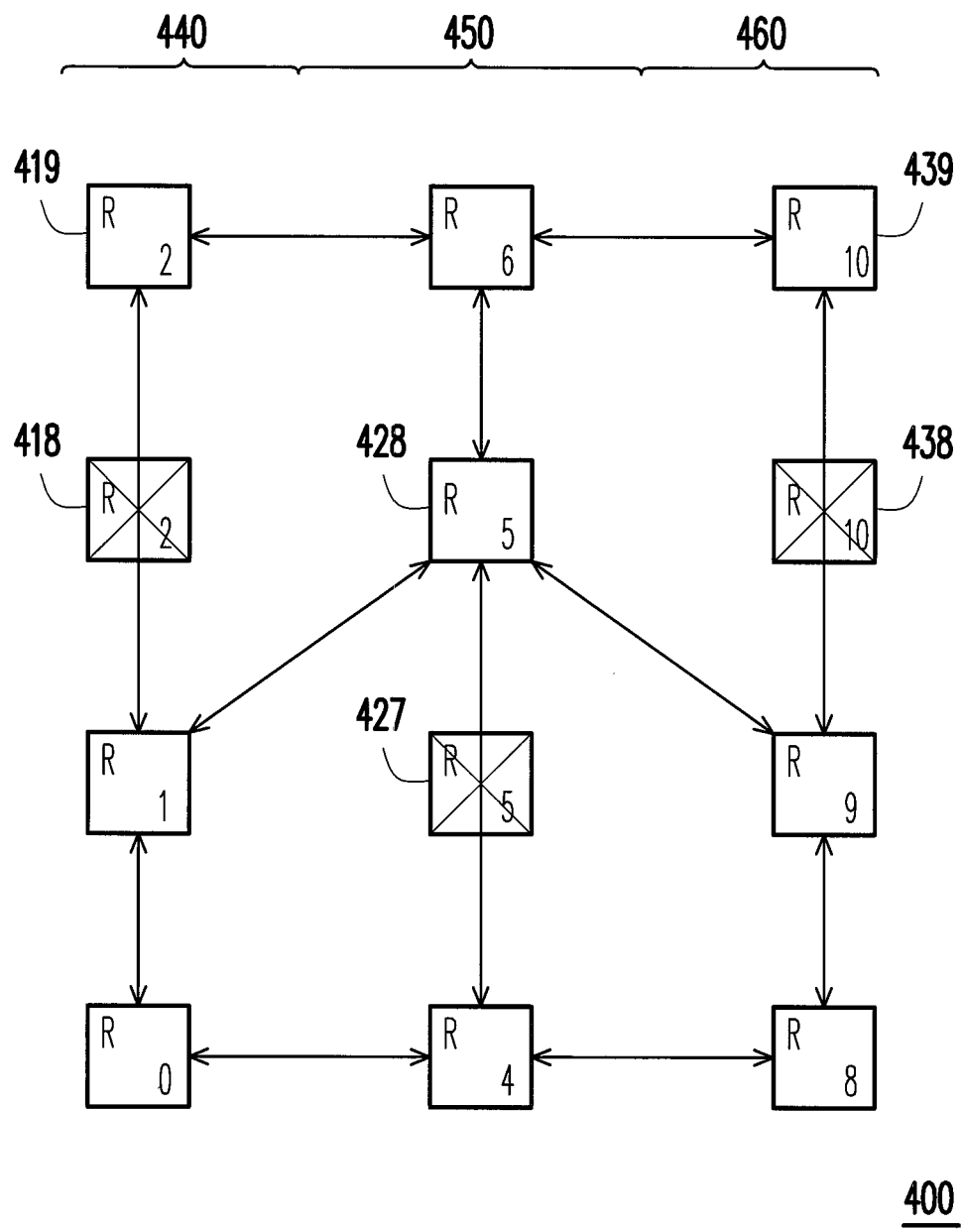

The connection channels between the routers illustrated in FIG. 5 and FIG. 7 are all unidirectional and output signals and input signals have to be transmitted through different connection channels. Accordingly, two open connection channels are required between two routers that are coupled with each other. However, the connection channels are not limited to unidirectional connection channels in the disclosure, and bidirectional connection channels may also be adopted in some other embodiments of the disclosure. If bidirectional connection channels are adopted, only one open connection channel is required between two routers for transmitting input and output signals. FIG. 8 illustrates the manycore NoC 400 after all the connection channels thereof are replaced by bidirectional connection channels.

Before the routers in FIG. 7 are damaged, the nine cores of the manycore NoC 400 presents a logical topology of a 3×3 matrix. After the routers in FIG. 7 are damaged, through the adjustment of connection channels, the adjustment of connection channels of corresponding cores, and the adjustment of identification codes of the routers illustrated in FIG. 7, the damaged routers 418, 427, and 438 are respectively replaced by the routers 419, 428, and 439 so that the coupling relationship between the nine cores of the manycore NoC 400 still presents the same logical topology. The fault-tolerant architecture provided by the present embodiment allows the manycore NoC 400 to keep its original logical topology as long as there is no more than one damaged router in each cluster. Thus, the routing software executed by each router needs not to be re-designed, and no fault-tolerant function is required in such routing software.

Figure 9A:
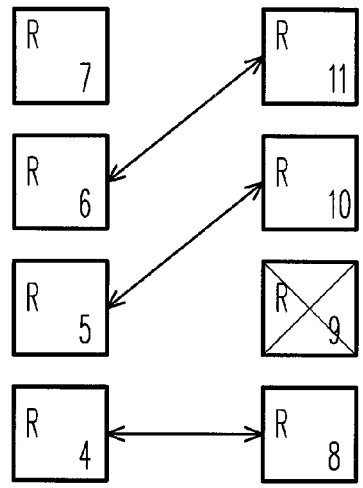
FIG. 9A to FIG. 9U are schematic diagrams illustrating router connections of a manycore NoC according to an embodiment of the disclosure.
Figure 9B:
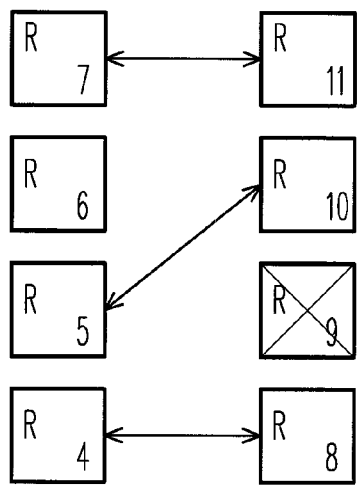
Figure 9C:
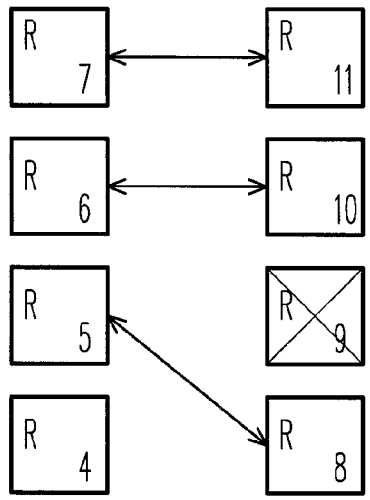
Figure 9D:
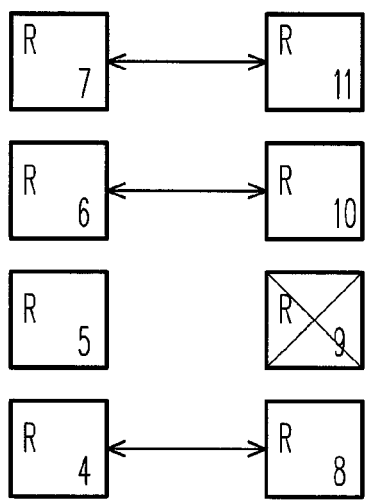
Figure 9E:
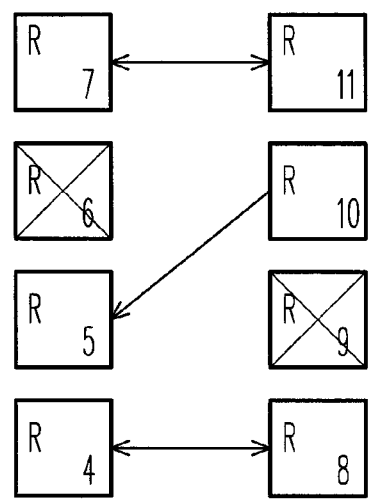
Figure 9F:
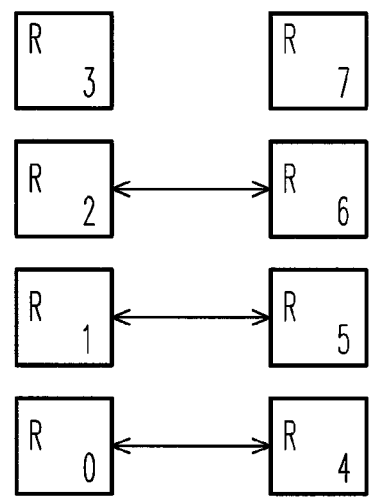
Figure 9G:
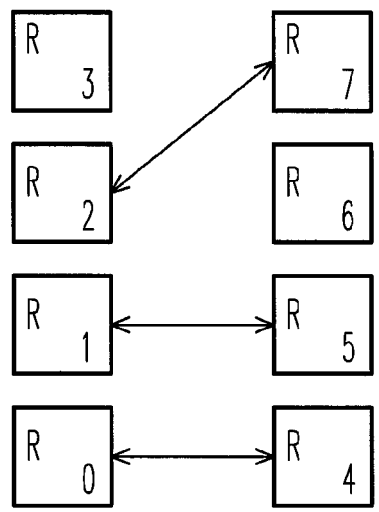
Figure 9H:
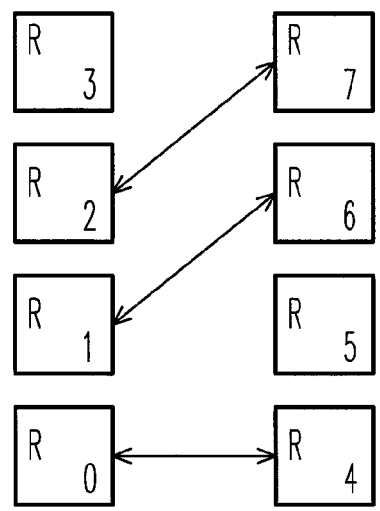
Figure 9I:
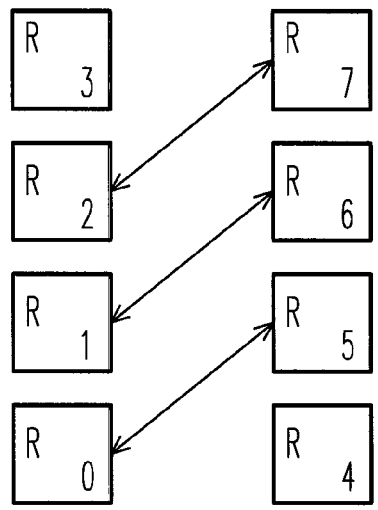
Figure 9J:
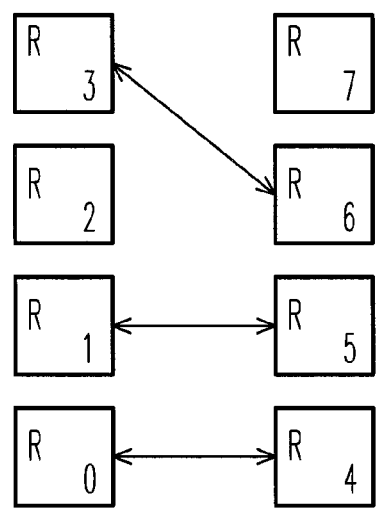
Figure 9K:
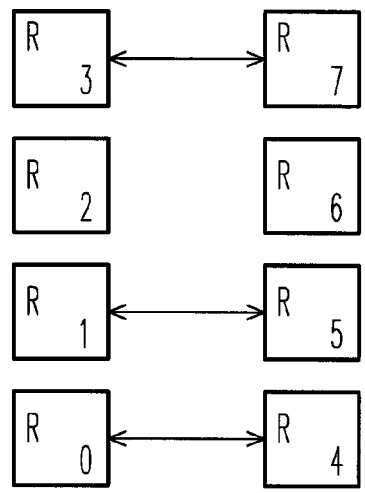
Figure 9L:
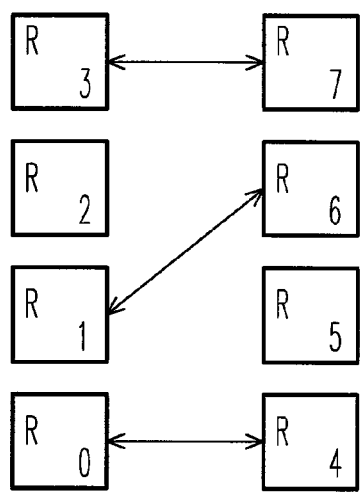
Figure 9M:
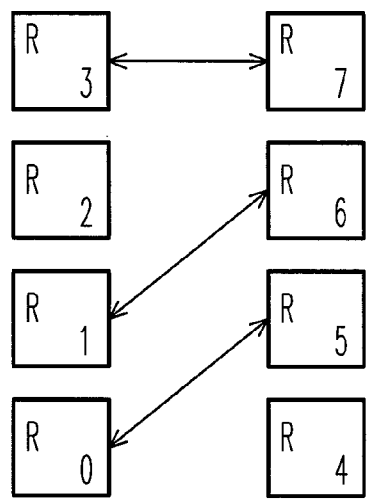
Figure 9N:
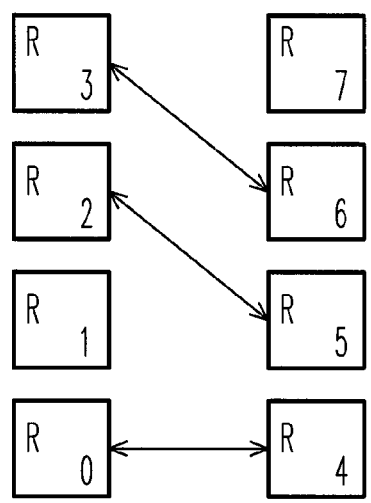
Figure 9O:
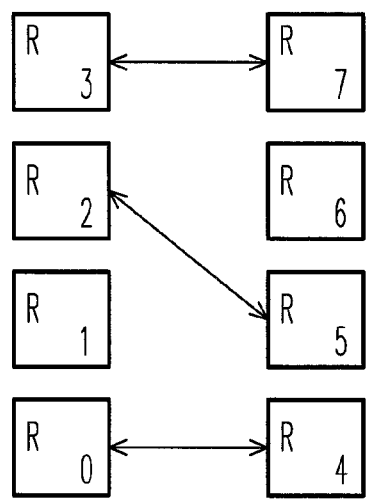
Figure 9P:
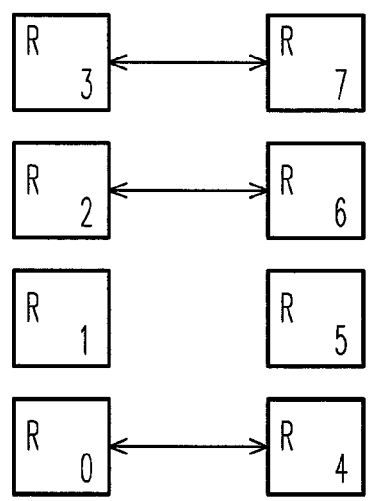
Figure 9Q:
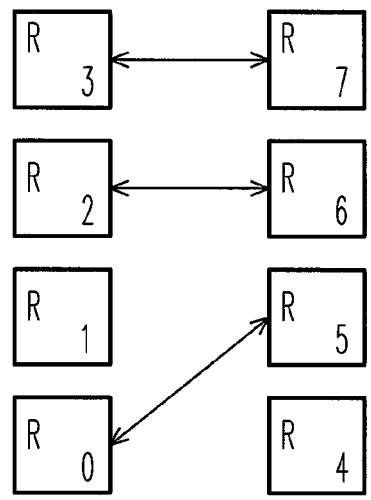
Figure 9R:
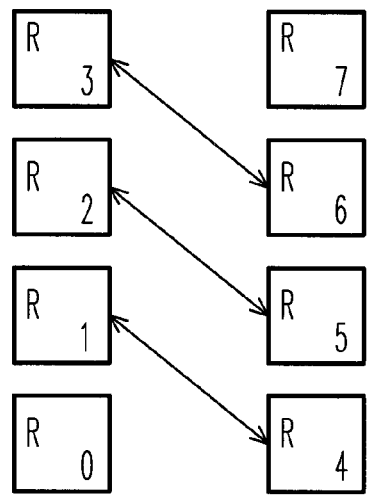
Figure 9S:
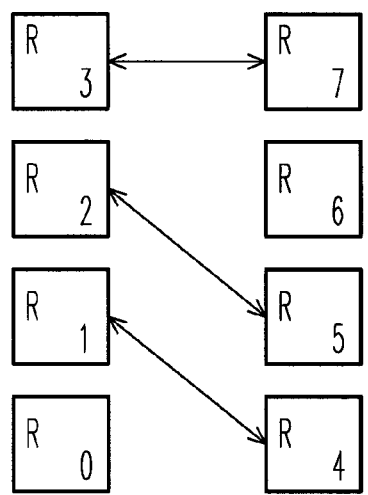
Figure 9T:
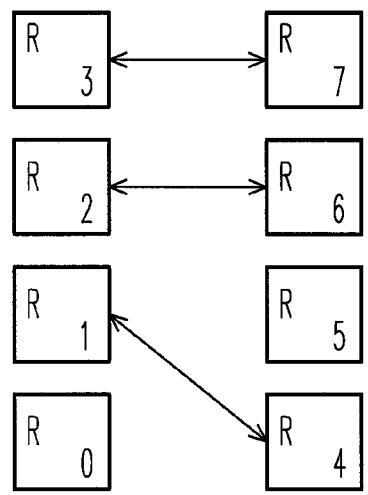
Figure 9U:
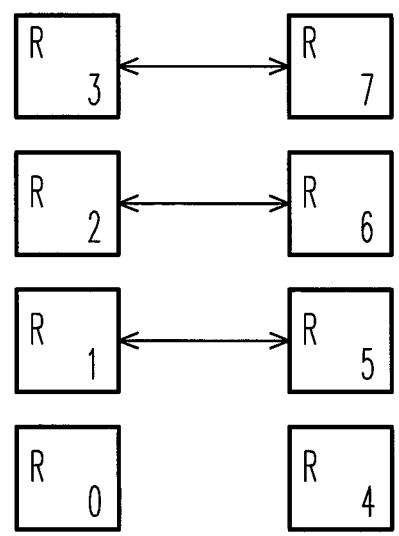

When some routers are damaged, the routers of adjacent two clusters may be coupled in more than one manner. Taking the manycore NoC 400 as an example, if there is only one damaged router in the two adjacent clusters, the routers of the two clusters may be coupled in four different ways, as shown in FIG. 9A to FIG. 9D, wherein only the router R9 is damaged. When there is a damaged router in each of the two adjacent clusters, the routers of these two clusters can be coupled in only one manner, as shown in FIG. 9E, wherein the routers R6 and R9 are damaged. When all routers in two adjacent clusters are fault free, there are 16 ways to couple the routers as shown in FIG. 9F to FIG. 9U.

The manycore NoC 400 has three clusters, each of the clusters has three cores and four routers, and at most one router can be damaged in each of the clusters. However, the disclosure is not limited thereto.

In other embodiments of the disclosure, the manycore NoC includes C clusters, each of the clusters includes P cores and R routers, and at most S routers can be damaged in each of the clusters without affecting the proper operation of the manycore NoC, wherein S=R−P, and C, P, R, and S are all positive integers. The cores and routers of each cluster may be arranged in rows or columns or may also be arranged in other patterns.

In each cluster of foregoing manycore NoC, the cores and the routers are arranged in a predetermined sequence, and the sequence determines the numbers of the cores and the routers. The core arranged at the front is called the first core, and the core arranged at the end is called the $P^{th}$ core. The router arranged at the front is called the first router, and the router arranged at the end is called the $R^{th}$ router. How to determine the sequence of the cores and the routers is not limited in the disclosure. If the cores and routers of a cluster are arranged in a column, the sequence thereof may be from top to bottom or from bottom to top. If the cores and routers of a cluster are arranged in a row, the sequence thereof may be from left to right or from right to left. The sequence of cores and routers is not limited to being in a leftward, rightward, upward, or downward direction, and which may also be determined in a more complicated manner.

The clusters of foregoing manycore NoC also have a sequence, and the sequence determines the numbers of the clusters. The cluster at the front is called the first cluster, and the cluster at the end is called the $C^{th}$ cluster. How to determine the sequence of the clusters is not limited in the disclosure. The sequence of clusters is not limited to being in a leftward, rightward, upward, or downward direction, and which may also be determined in a more complicated manner.

In foregoing manycore NoC, regarding each integer i that satisfies $1<=i<=C$ and each integer j that satisfies $1<=j<=P$, the $j^{th}$ core of the $i^{th}$ cluster is corresponding to a first set, the first set includes S+1 routers of the $i^{th}$ cluster, the $i^{th}$ cluster further includes connection channels between the $j^{th}$ core and each router in the first set, and the $j^{th}$ core is selectively coupled to one of the routers in the first set.

Regarding each integer i that satisfies $1<=i<=C$ and each integer k that satisfies $2<=k<=R$, the $k^{th}$ router of the $i^{th}$ cluster of the manycore NoC is corresponding to a second set, the second set includes 1 to S+1 routers before the $k^{th}$ router of the $i^{th}$ cluster, the $i^{th}$ cluster further includes connection channels between the $k^{th}$ router and each router in the second set, and the $k^{th}$ router is selectively coupled to one of the routers in the second set.

Regarding each integer i that satisfies $1<=i<=C$ and each integer k that satisfies $1<=k<=R-1$, the $k^{th}$ router of the $i^{th}$ cluster of the manycore NoC is corresponding to a third set, the third set includes 1 to S+1 routers after the $k^{th}$ router of the $i^{th}$ cluster, the $i^{th}$ cluster further includes connection channels between the $k^{th}$ router and each router in the third set, and the $k^{th}$ router is selectively coupled to one of the routers in the third set.

Regarding each integer i that satisfies $2<=i<=C$ and each integer k that satisfies $1<=k<=R$, the $k^{th}$ router of the $i^{th}$ cluster of the manycore NoC is corresponding to a fourth set, the fourth set includes 2 to 2S+1 routers of the $(i-1)^{th}$ cluster, the manycore NoC further includes connection channels between the $k^{th}$ router and each router in the fourth set, and the $k^{th}$ router is selectively coupled to one of the routers in the fourth set.

Regarding each integer i that satisfies $1<=i<=C-1$ and each integer k that satisfies $1<=k<=R$, the $k^{th}$ router of the $i^{th}$ cluster of the manycore NoC is corresponding to a fifth set, the fifth set includes 2 to 2S+1 routers of the $(i+1)^{th}$ cluster, the manycore NoC further includes connection channels between the $k^{th}$ router and each router in the fifth set, and the $k^{th}$ router is selectively coupled to one of the routers in the fifth set.

In some embodiments of the disclosure, the first set to the fifth set can be further confined. Herein the first set corresponding to the $j^{th}$ core of the $i^{th}$ cluster may include the $j^{th}$ to the $(j+S)^{th}$ router of the $i^{th}$ cluster.

The second set corresponding to the $k^{th}$ router of the $i^{th}$ cluster may include the $(k-\min\{S+1, k-1\})^{th}$ to the $(k-1)^{th}$ router of the $i^{th}$ cluster, wherein min represents the minimum function that returns the minimum value in { }.

The third set corresponding to the $k^{th}$ router of the $i^{th}$ cluster may include the $(k+1)^{th}$ to the $(k+\min\{S+1, R-k\})^{th}$ router of the $i^{th}$ cluster.

The fourth set corresponding to the $k^{th}$ router of the $i^{th}$ cluster may include the $(k-\min\{S, k-1\})^{th}$ to the $(k+\min\{S, R-k\})^{th}$ router of the $(i-1)^{th}$ cluster.

The fifth set corresponding to the $k^{th}$ router of the $i^{th}$ cluster may include the $(k-\min\{S, k-1\})^{th}$ to the $(k+\min\{S, R-k\})^{th}$ router of the $(i+1)^{th}$ cluster.

Regarding each integer i that satisfies $1<=i<=C$ and each integer j that satisfies $1<=j<=P$, the $i^{th}$ cluster further includes a first selector corresponding to the $j^{th}$ core and S+1 connection channels. The S+1 connection channels are coupled to the $j^{th}$ core and the routers in the first set corresponding to the $j^{th}$ core. The first selector selects one of the routers in the first set according to a connection control signal generated by a connection pattern controller, opens the connection channel between the selected router and the $j^{th}$ core, and closes the connection channels between the rest routers in the first set and the $j^{th}$ core, so as to couple the selected router with the $j^{th}$ core.

Regarding each router, the manycore NoC further includes a plurality of connection channels corresponding to the router. These connection channels couple the router with routers in the second set, the third set, the fourth set, and the fifth set corresponding to the router.

If $R>=3$, regarding each integer i that satisfies $1<=i<=C$ and each integer k that satisfies $3<=k<=R$, the $i^{th}$ cluster further includes a second selector corresponding to the $k^{th}$ router. The second selector selects one of the routers in the second set corresponding to the $k^{th}$ router according to the connection control signal, opens the connection channel between the selected router and the $k^{th}$ router, and closes the connection channels between the rest routers in the second set and the $k^{th}$ router, so as to couple the selected router with the $k^{th}$ router.

If $R>=3$, regarding each integer i that satisfies $1<=i<=C$ and each integer k that satisfies $1<=k<=R-2$, the $i^{th}$ cluster further includes a third selector corresponding to the $k^{th}$ router. The third selector selects one of the routers in the third set corresponding to the $k^{th}$ router according to the connection control signal, opens the connection channel between the selected router and the $k^{th}$ router, and closes the connection channels between the rest routers in the third set and the $k^{th}$ router, so as to couple the selected router with the $k^{th}$ router.

Regarding each integer i that satisfies $2<=i<=C$ and each integer k that satisfies $1<=k<=R$, the $i^{th}$ cluster further includes a fourth selector corresponding to the $k^{th}$ router. The fourth selector selects one of the routers in the fourth set corresponding to the $k^{th}$ router according to the connection control signal, opens the connection channel between the selected router and the $k^{th}$ router, and closes the connection channels between the rest routers in the fourth set and the $k^{th}$ router, so as to couple the selected router with the $k^{th}$ router.

Regarding each integer i that satisfies $1<=i<=C-1$ and each integer k that satisfies $1<=k<=R$, the $i^{th}$ cluster further includes a fifth selector corresponding to the $k^{th}$ router. The fifth selector selects one of the routers in the fifth set corresponding to the $k^{th}$ router according to the connection control signal, opens the connection channel between the selected router and the $k^{th}$ router, and closes the connection channels between the rest routers in the fifth set and the $k^{th}$ router, so as to couple the selected router with the $k^{th}$ router.

If foregoing parameter C is set to 3, the parameter P is set to 3, the parameter R is set to 4, S is set to 1, and the cores and routers of each cluster are arranged in a column, the manycore NoC is the manycore NoC 400 illustrated in FIG. 4 and FIG. 5.

Figure 10:
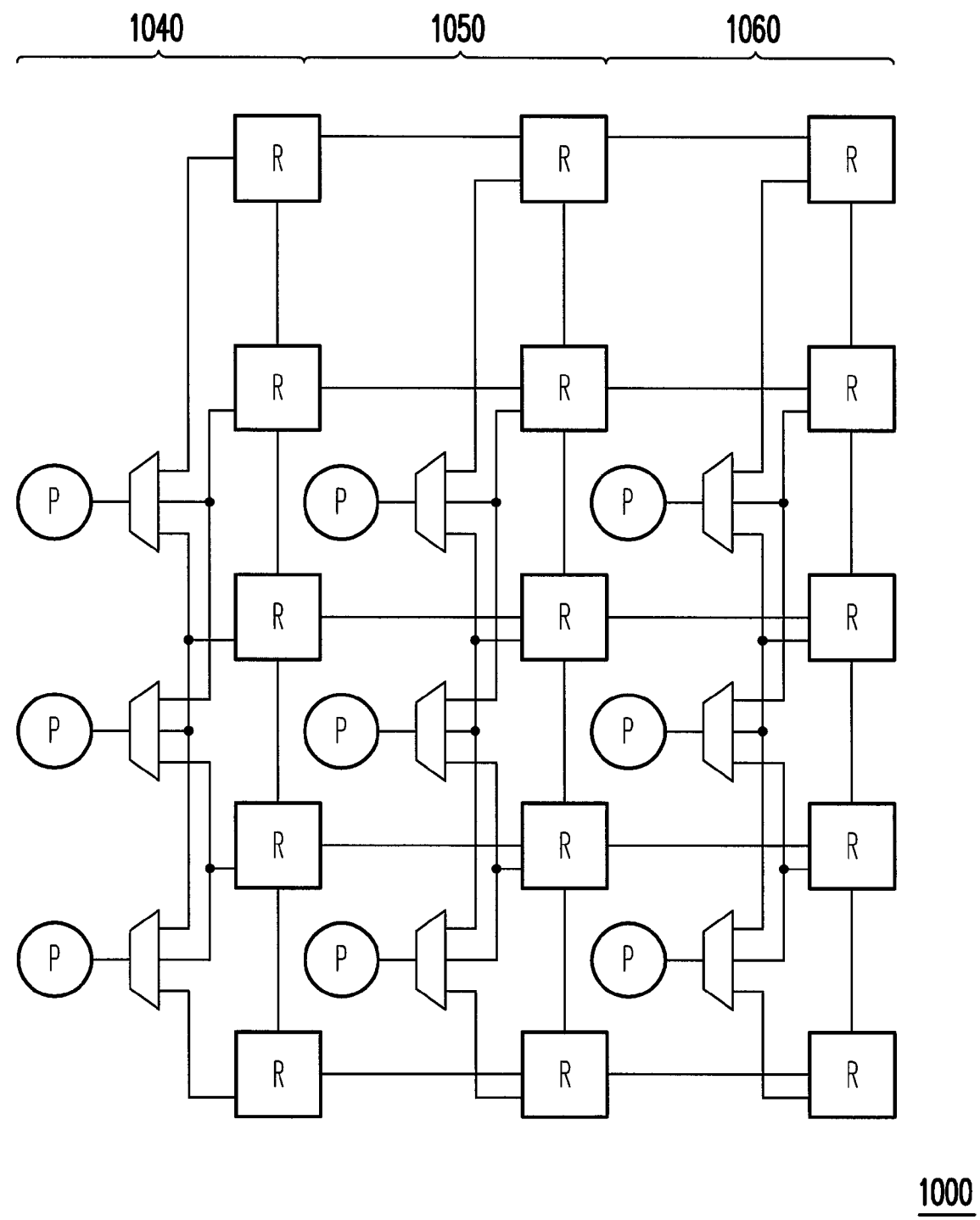
FIG. 10 and FIG. 11 are schematic diagrams of a manycore NoC according to an embodiment of the disclosure.
Figure 11:
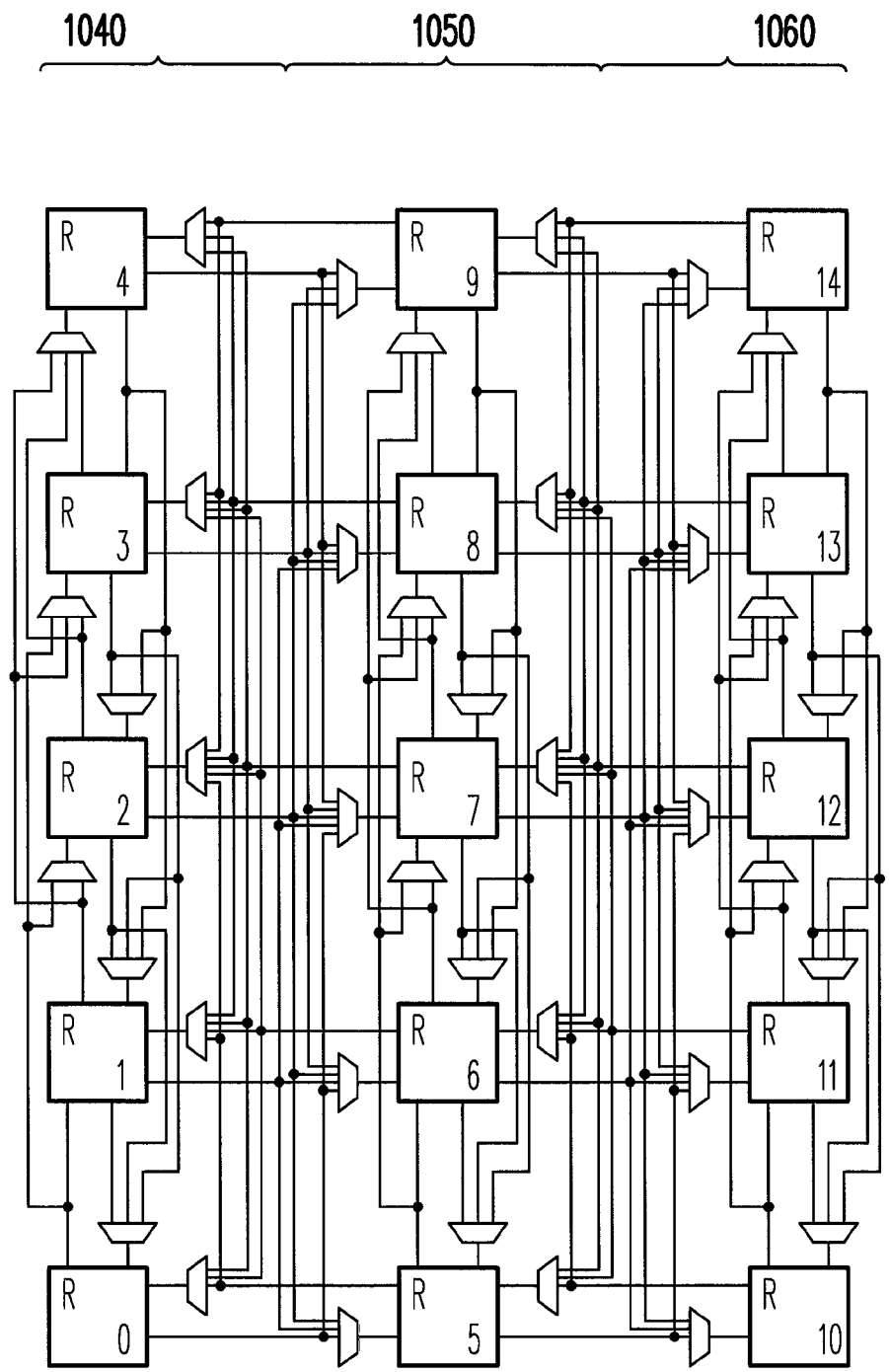

If the parameter C is set to 3, the parameter P is set to 3, the parameter R is set to 5, the parameter S is set to 2, and the cores and routers of each cluster are arranged in a column, the manycore NoC is the manycore NoC 1000 illustrated in FIG. 10 and FIG. 11. FIG. 10 illustrates the coupling relationship between the cores and the routers of the manycore NoC 1000, and FIG. 11 illustrates the coupling relationship between the routers of the manycore NoC 1000. Similarly, in FIG. 10 and FIG. 11, the circles marked with P are cores, the squares marked with R are routers, and the trapezia are selectors. The manycore NoC 1000 includes three clusters 1040, 1050, and 1060, wherein each of the clusters includes three cores and five routers.

Figure 12:
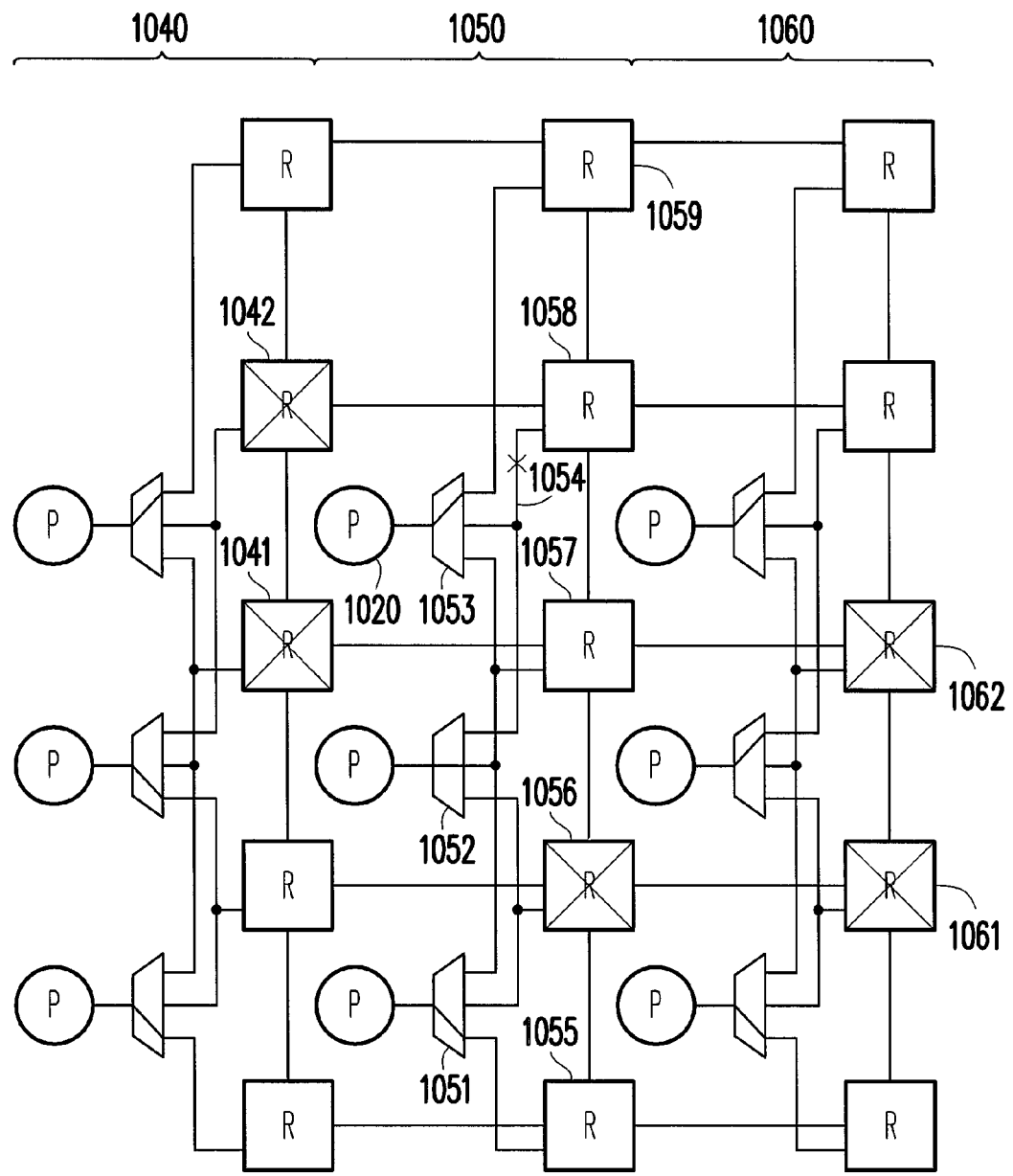
FIG. 12 and FIG. 13 are schematic diagrams illustrating the fault-tolerant architecture of a manycore NoC according to an embodiment of the disclosure.
Figure 13:
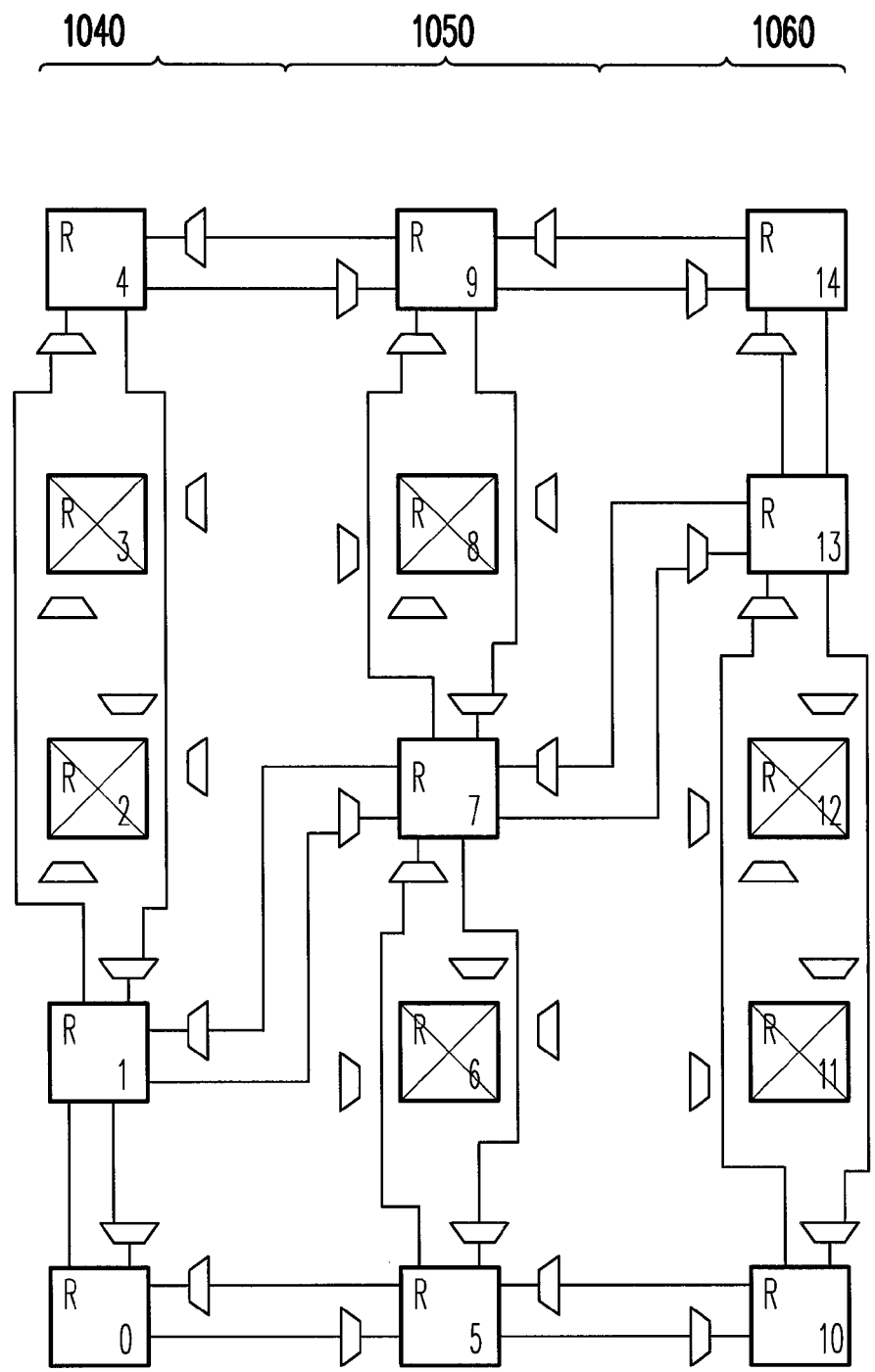

FIG. 12 and FIG. 13 are schematic diagrams illustrating the fault-tolerant architecture of the manycore NoC 1000. In FIG. 12, the routers 1041 and 1042 of the cluster 1040 are damaged, the router 1056 of the cluster 1050 is damaged, the connection channel 1054 between the core 1020 and the router 1058 is damaged, and the routers 1061 and 1062 of the cluster 1060 are damaged. FIG. 12 illustrates the adjustment of the connection channels in the manycore NoC 1000 when foregoing damages happen. Each core is coupled to the routers in the corresponding first set respectively through three connection channels. Under the control of a connection pattern controller (not shown), each selector opens one of the three connection channels and closes the other two connection channels so that the three cores of each cluster are coupled to three undamaged routers of the same cluster in a one-on-one manner and the damaged connection channel 1054 is avoided. Which connection channel is opened can be determined based on the lines inside each selector. For example, the selector 1051 of the cluster 1050 opens the connection channel leading to the router 1055, the selector 1052 opens the connection channel leading to the router 1057, and the selector 1053 opens the connection channel leading to the router 1059.

FIG. 13 illustrates the adjustment of the connection channels between the routers when some routers of the manycore NoC 1000 are damaged. FIG. 13 only illustrates the connection channels opened by the selectors, wherein the routers R2, R3, R6, R8, R11, and R12 are damaged. As shown in FIG. 13, under the control of the connection pattern controller, the routers R1 and R4 of the cluster 1040 are coupled with each other, and the damaged routers R2 and R3 are skipped. The routers R5 and R7 of the cluster 1050 are coupled with each other, and the damaged router R6 is skipped. The routers R7 and R9 are coupled with each other, and the damaged router R8 is skipped. The routers R10 and R13 of the cluster 1060 are coupled with each other, and the damaged routers R11 and R12 are skipped.

Figure 14:
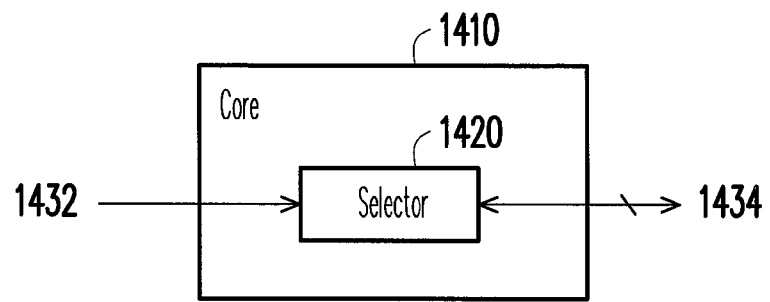
FIG. 14 is a schematic diagram illustrating a core and a selector of a manycore NoC according to an embodiment of the disclosure.

In foregoing manycore NoC 400 and manycore NoC 1000, the selectors are independent of the corresponding cores and routers. In some embodiments of the disclosure, each first selector coupled between a core and a router can be integrated into the corresponding core, as shown in FIG. 14. In FIG. 14, the first selector 1420 is integrated into the corresponding core 1410 and becomes a part of the core 1410. The first selector 1420 receives a connection control signal 1432 and is coupled to a plurality of connection channels 1434, wherein these connection channels 1434 respectively lead to a plurality of routers that are coupled with the core 1410.

In some embodiments of the disclosure, some of the first selectors of an entire manycore NoC are independent of the corresponding cores, while the rest first selectors are integrated into the corresponding cores. Namely, independent and integrated first selectors coexist in the manycore NoC.

Figure 15:
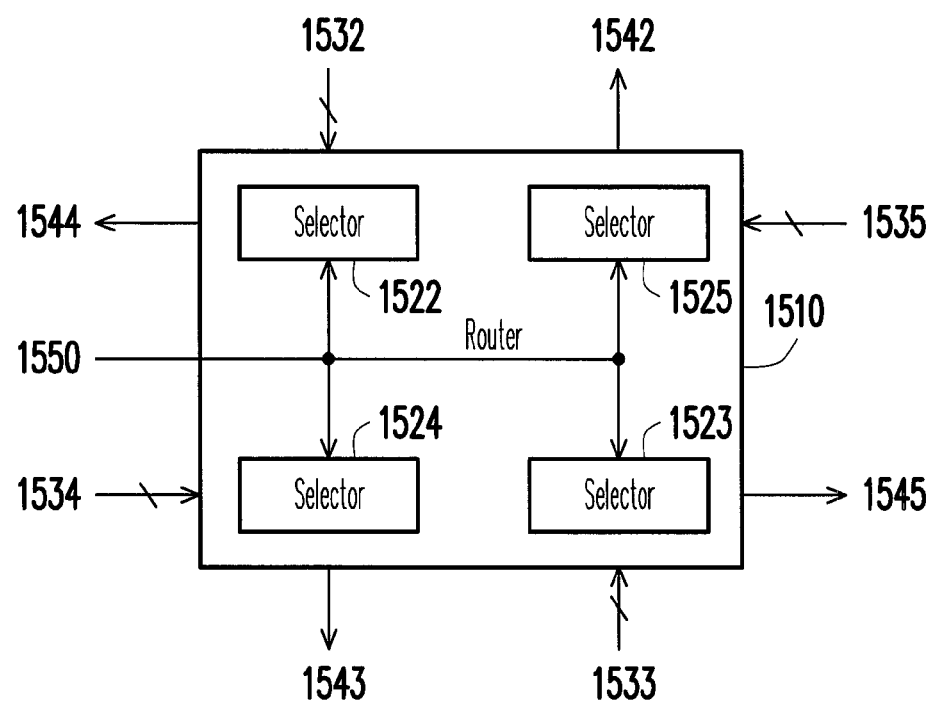
FIG. 15 is a schematic diagram illustrating a router and its corresponding selectors of a manycore NoC according to an embodiment of the disclosure.

In some embodiments of the disclosure, each selector coupled between the routers can be integrated into the corresponding router, as shown in FIG. 15. In FIG. 15, each of the selectors 1522-1525 is integrated into the corresponding router 1510 as a part of the router 1510. The selectors 1522-1525 are respectively a second selector, a third selector, a fourth selector, and a fifth selector corresponding to the router 1510. The router 1510 receives a connection control signal 1550 and has a plurality of connection channels 1532-1535 and 1542-1545. Herein the input connection channels 1532 and 1533 are respectively from a preceding and a following routers of the same cluster and are respectively controlled by the selectors 1522 and 1523. The input connection channels 1534 and 1535 are respectively from routers of a previous adjacent cluster and a following adjacent cluster and are respectively controlled by the selectors 1524 and 1525. The output connection channels 1542 and 1543 respectively lead to a preceding and a following routers of the same cluster. The output connection channels 1544 and 1545 respectively lead to routers of a previous adjacent cluster and a following adjacent cluster.

In some embodiments of the disclosure, if all the second selectors, third selectors, fourth selectors, and fifth selectors of an entire manycore NoC are considered a set, a portion of the selectors in this set may be made independent of the corresponding routers, while another portion of the selectors may be integrated into the corresponding routers. Namely, independent and integrated first selectors coexist in the manycore NoC.

In summary, in the disclosure, a clustered architecture and router-level redundancy are adopted to improve the system operation efficiency and yield. In the disclosure, the routers of each cluster share at least one redundant router, and this redundant router allows one or more of the routers at any position to be damaged. Moreover, the redundant routers diversify the network connections between routers and cores and the network connections between routers.

In the disclosure, a manycore NoC retains its original logical topology by using redundant routers and connection channels after resetting the connection channels due to damaged routers and connection channels. Namely, the routing problem after some routers and connection channels are damaged is resolved on the hardware level. Thus, the routing software needs not to be altered and requires no additional fault-tolerant function. Accordingly, the system cost is reduced. Furthermore, the cost of a manycore system is reduced by averaging the cost of redundant routers among multiple routers.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A manycore networks-on-chip (NoC), comprising:
C clusters, wherein each of the clusters comprises P cores and R routers, $S=R-P$, and C, P, R, and S are all positive integers;
wherein regarding each integer i that satisfies $1<=i<=C$ and each integer j that satisfies $1<=j<=P$, the $j^{th}$ core of the $i^{th}$ cluster is corresponding to a first set, the first set comprises S+1 routers of the $i^{th}$ cluster, the $i^{th}$ cluster further comprises connection channels between the $j^{th}$ core and each router in the first set, and the $j^{th}$ core is selectively coupled to one of the routers in the first set;
wherein regarding each integer i that satisfies $1<=i<=C$ and each integer k that satisfies $2<=k<=R$, the $k^{th}$ router of the $i^{th}$ cluster is corresponding to a second set, the second set comprises 1 to S+1 routers before the $k^{th}$ router of the $i^{th}$ cluster, the $i^{th}$ cluster further comprises connection channels between the $k^{th}$ router and each router in the second set, and the $k^{th}$ router is selectively coupled to one of the routers in the second set;
wherein regarding each integer i that satisfies $1<=i<=C$ and each integer k that satisfies $1<=k<=R-1$, the $k^{th}$ router of the $i^{th}$ cluster is corresponding to a third set, the third set comprises 1 to S+1 routers after the $k^{th}$ router of the $i^{th}$ cluster, the $i^{th}$ cluster further comprises connection channels between the $k^{th}$ router and each router in the third set, and the $k^{th}$ router is selectively coupled to one of the routers in the third set;

wherein regarding each integer i that satisfies 2<=i<=C and each integer k that satisfies 1<=k<=R, the $k^{th}$ router of the $i^{th}$ cluster is corresponding to a fourth set, the fourth set comprises 2 to 2S+1 routers of the $(i-1)^{th}$ cluster, the manycore NoC further comprises connection channels between the $k^{th}$ router and each router in the fourth set, and the $k^{th}$ router is selectively coupled to one of the routers in the fourth set;

wherein regarding each integer i that satisfies 1<=i<=C-1 and each integer k that satisfies 1<=k<=R, the $k^{th}$ router of the $i^{th}$ cluster is corresponding to a fifth set, the fifth set comprises 2 to 2S+1 routers of the $(i+1)^{th}$ cluster, the manycore NoC further comprises connection channels between the $k^{th}$ router and each router in the fifth set, and the $k^{th}$ router is selectively coupled to one of the routers in the fifth set; and wherein the routers transmit signals among the cores.

2. The manycore NoC according to claim 1, wherein each of the cores is a processor, a processing element, a data processing engine (DPE), a digital signal processor (DSP), a graphics processing unit (GPU), or a memory.

3. The manycore NoC according to claim 1, wherein the first set corresponding to the $j^{th}$ core of the $i^{th}$ cluster comprises the $j^{th}$ to the $(j+S)^{th}$ routers of the $i^{th}$ cluster.

4. The manycore NoC according to claim 1, wherein regarding each integer i that satisfies 1<=i<=C and each integer j that satisfies 1<=j<=P, the $i^{th}$ cluster further comprises a first selector corresponding to the $j^{th}$ core, the first selector selects one of the routers in the first set according to a connection control signal and couples the selected router with the $j^{th}$ core.

5. The manycore NoC according to claim 4 further comprising:
a connection pattern controller, generating the connection control signal and controlling the first selectors to couple the cores of each of the clusters with the routers of the same cluster through the connection control signal, wherein none of the coupled routers is damaged, and none of the connection channels between the coupled routers and the coupled cores of the same cluster is damaged.

6. The manycore NoC according to claim 5, wherein the first selectors couple the cores of each of the clusters with the routers of the same cluster in a one-on-one manner.

7. The manycore NoC according to claim 6, wherein among the cores of each of the clusters, if a first core is before a second core, the router coupled to the first core is also before the router coupled to the second core.

8. The manycore NoC according to claim 4, wherein each of the first selectors is independent of the corresponding core or integrated into the corresponding core.

9. The manycore NoC according to claim 1, wherein
the second set corresponding to the $k^{th}$ router of the $i^{th}$ cluster comprises the $(k-\min\{S+1, k-1\})^{th}$ to the $(k-1)^{th}$ routers of the $i^{th}$ cluster, wherein min represents a minimum function that returns a minimum value in { };
the third set corresponding to the $k^{th}$ router of the ith cluster comprises the $(k+1)^{th}$ to the $(k+\min\{S+1, R-k\})^{th}$ routers of the $i^{th}$ cluster;

the fourth set corresponding to the $k^{th}$ router of the ith cluster comprises the $(k-\min\{S, k-1\})^{th}$ to the $(k+\min\{S, R-k\})^{th}$ routers of the $(i-1)^{th}$ cluster; and the fifth set corresponding to the $k^{th}$ router of the $i^{th}$ cluster comprises the $(k-\min\{S, k-1\})^{th}$ to the $(k+\min\{S, R-k\})^{th}$ routers of the $(i+1)^{th}$ cluster.

10. The manycore NoC according to claim 1, wherein
when R>=3, regarding each integer i that satisfies 1<=i<=C and each integer k that satisfies 3<=k<=R, the $i^{th}$ cluster further comprises a second selector corresponding to the $k^{th}$ router, and the second selector selects one of the routers in the second set according to a connection control signal and couples the selected router with the $k^{th}$ router;

when R>=3, regarding each integer i that satisfies 1<=i<=C and each integer k that satisfies 1<=k<=R-2, the $i^{th}$ cluster further comprises a third selector corresponding to the $k^{th}$ router, and the third selector selects one of the routers in the third set according to the connection control signal and couples the selected router with the $k^{th}$ router;

regarding each integer i that satisfies 2<=i<=C and each integer k that satisfies 1<=k<=R, the $i^{th}$ cluster further comprises a fourth selector corresponding to the $k^{th}$ router, and the fourth selector selects one of the routers in the fourth set according to the connection control signal and couples the selected router with the $k^{th}$ router; and regarding each integer i that satisfies 1<=i<=C-1 and each integer k that satisfies 1<=k<=R, the ith cluster further comprises a fifth selector corresponding to the $k^{th}$ router, and the fifth selector selects one of the routers in the fifth set according to the connection control signal and couples the selected router with the $k^{th}$ router.

11. The manycore NoC according to claim 10 further comprising:
a connection pattern controller, generating the connection control signal and controlling the second selectors, the third selectors, the fourth selectors, and the fifth selectors to couple the routers through the connection control signal, wherein none of the coupled routers is damaged, and none of the connection channels between the coupled routers is damaged.

12. The manycore NoC according to claim 11, wherein in each of the clusters, the second selectors and the third selectors couple the routers of the cluster in series according to the connection control signal, and a sequence in which the routers are coupled in series matches a sequence of the routers in the cluster, none of the coupled routers is damaged, and none of the connection channels between the coupled routers is damaged.

13. The manycore NoC according to claim 11, wherein in each of the clusters, when there are damaged routers, an identification code of each of the routers starting from a first damaged router is shifted forward according to the connection control signal.

14. The manycore NoC according to claim 11, wherein the fourth selectors or the fifth selectors couple the routers of the $i^{th}$ cluster to a same number of routers of an adjacent cluster in a one-on-one manner according to the connection control signal, wherein none of the coupled routers is damaged, and none of the connection channels between the coupled routers is damaged.

15. The manycore NoC according to claim 14, wherein if a first router is before a second router in the $i^{th}$ cluster, the first router is coupled to a third router of the adjacent cluster, and the second router is coupled to a fourth router of the adjacent cluster, then in the adjacent cluster, the third router is before the fourth router.

16. The manycore NoC according to claim 10, wherein each of the second selectors, the third selectors, the fourth selectors, and the fifth selectors is independent of the corresponding router or integrated into the corresponding router.

* * * * *